UNITED STATES PATENT OFFICE.

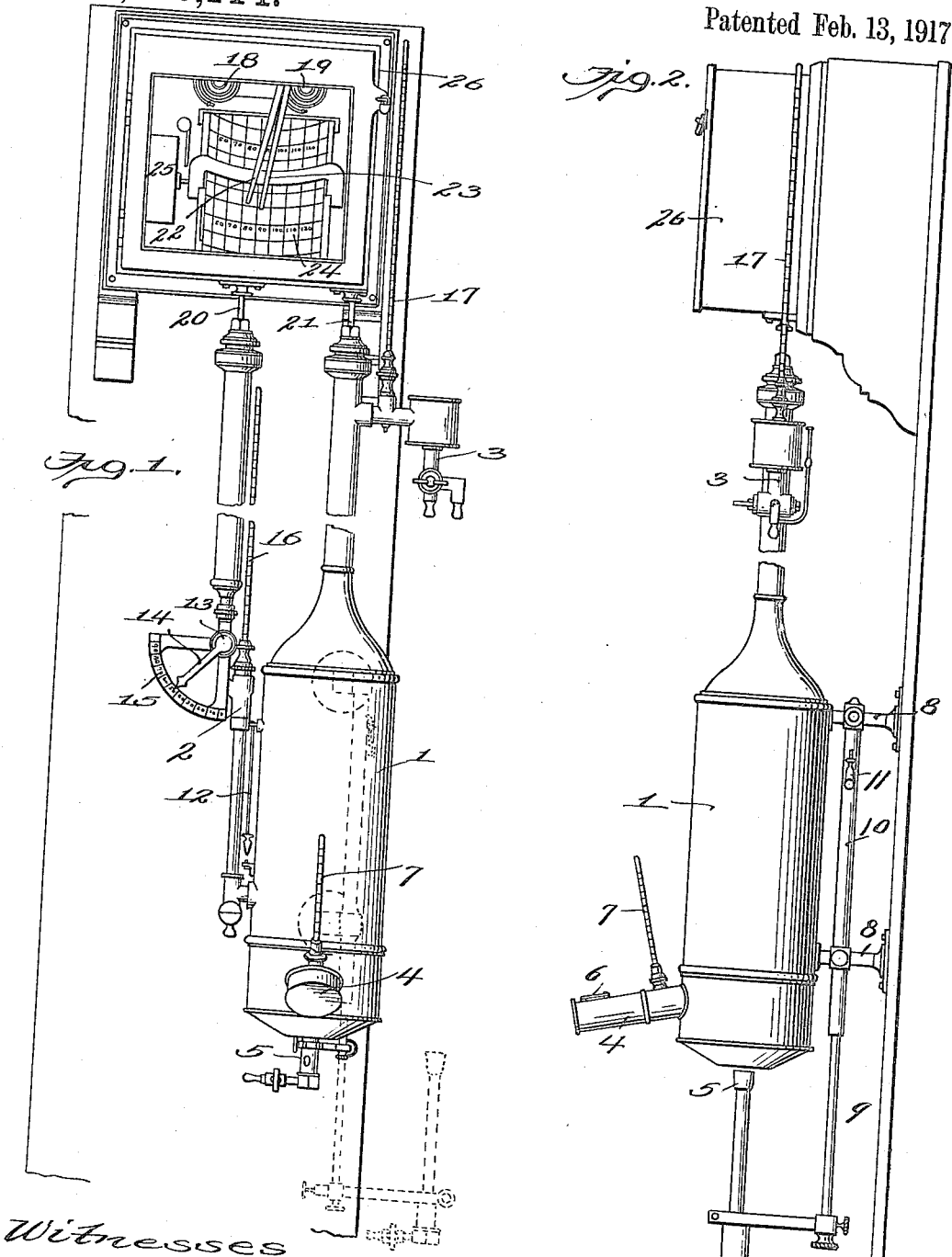

WALTER KENDRICK HARRINGTON, OF ANDOVER, NEW JERSEY, ASSIGNOR TO THE AMERICAN METER COMPANY, OF NEW YORK, N. Y., A CORPORATION OF NEW YORK.

RECORDING-CALORIMETER.

1,216,114.

Specification of Letters Patent.

Patented Feb. 13, 1917.

Application filed November 10, 1914. Serial No. 871,390.

*To all whom it may concern:*

Be it known that I, WALTER KENDRICK HARRINGTON, a citizen of the United States, residing at Andover, in the county of Sussex and State of New Jersey, have invented new and useful Improvements in Recording-Calorimeters, of which the following is a specification.

The present invention relates to improvements in calorimeters, and its object is to provide an instrument of this character which is capable of recording readings during a test or series of tests to determine the heat value of a combustible substance such, for example, as gas, thereby assisting the operator by relieving him of the necessity of visually observing and making notes of the readings which must be done frequently, insuring greater accuracy and avoiding the occurrence of errors, as well as providing a permanent record for each test.

To these and other ends, the invention consists in certain improvements, and combinations and arrangements of parts, all as will be hereinafter more fully described, the novel features being pointed out particularly in the claims at the end of the specification.

In the accompanying drawing:—

Figure 1 is a front elevation of a calorimeter constructed in accordance with the present invention;

Fig. 2 is a side elevation of the same.

Similar parts are designated by the same reference characters in the several views.

The present invention is applicable to calorimeters in general and more especially of the type wherein the heat evolved from the substance to be tested is absorbed by a flowing body of liquid, such as water, the temperatures of the flowing body of water prior and subsequent to the heating thereof being determined as factors in ascertaining the heat value of the combustible under test. In the present instance, the invention is shown applied to a calorimeter of the Junkers type, as shown and described in Letters Patent, No. 555,956, granted March 10, 1896. It is to be understood, however, that the invention is not restricted to calorimeters of that particular type and also that equivalent constructions within the scope of the claims at the end of the specification may be employed.

The calorimeter to which the invention is applied, as before stated, is of the type shown in the Junkers patent above identified, and hence a detailed description of the construction and mode of operation thereof is considered unnecessary. It may be noted, however, that 1 represents the heater having an inlet 2 for the flowing body of liquid, such as water, and an outlet 3 through which such liquid or water discharges from the instrument preparatory to being weighed. The liquid or water is supplied to the heater from any suitable source, it usually flowing by gravity from a tank placed in the same room with the instrument and located at a suitable height above the heater so as to insure the necessary flow of the liquid through the heater. 4 designates the exhaust flue for the waste products of combustion, the combustible substance to be tested being supplied to a burner 5 which latter burns the combustible within the heater. The exhaust flue 4 is provided with a damper 6 for regulating the draft of air into the combustion chamber of the heater, and a thermometer 7 is also provided whereby the temperature of the products of combustion discharging through the exhaust flue may be determined. The instrument may be supported in any suitable way. In the present instance it is supported by a pair of brackets 8 which may be secured to a wall or other suitable upright rigid support, and in order to enable the burner to be readily introduced and removed relatively to the heater, it is preferably connected to a vertically movable rod 9, the latter being slidable telescopically in a vertical tube 10, and a catch 11 being provided for holding the burner in operative position when so adjusted. A plumb-bob 12 is also preferably provided to facilitate leveling the instrument to insure upright position thereof.

The rate of flow of the water or liquid through the heater is governed by a valve 13, the latter being connected to the water or liquid inlet 2 and is provided with an adjusting arm or handle 14 which also serves as a pointer or indicator to coöperate with a scale 15, the position of the pointer or indicator 14 relatively to the scale 15 showing the extent of opening of the valve.

In instruments of this class, the heat value of the combustible is determined by multiplying the volume of liquid acted upon by the combustible by the difference in the temperatures of the liquid entering the heater and that leaving the heater, and dividing the product by the volume of combustible consumed or burned during such time. The present invention provides means for accurately recording the temperatures of the liquid in entering and leaving the heater, thus relieving the operator from the necessity of making such readings visually, which must be done frequently, and avoiding opportunity for errors in the notation of such readings. In the present instance, thermometers 16 and 17 are provided for indicating the temperatures of the water in entering and leaving the heater respectively. These thermometers are preferably provided for use in checking the readings of the recording means. The recording means provided according to the present invention may be of any type capable of recording, preferably upon the same sheet, the temperatures of the liquid entering and leaving the heater. A pair of recording thermometers 18 and 19 are shown in the present instance which are connected to the liquid inlet and outlet respectively of the heater by the connections 20 and 21. A pair of recording pens 22 and 23 are operatively connected to the thermometers 18 and 19 and they are both arranged to coöperate with the same graduated sheet 24, the graduations of the latter corresponding to temperature and time values and the sheet being advanced by a clock-motor 25. A case 26 preferably incloses the recording mechanism. Recording mechanisms of different types may be used, that shown being similar in its construction and principle of operation to that shown in Letters Patent, No. 1,063,349, of June 3, 1913, there being, however, two recording thermometers to coöperate with the same graduated sheet instead of one recording thermometer, as shown in said patent. By providing two recording thermometers to mark upon the same record sheet, an exact correspondence as to time is insured between the temperature readings for the inflowing and outflowing liquid, the determination of the difference in these temperatures at any given time is greatly facilitated, and there is no opportunity for error, due to confusion in the readings.

I claim as my invention:—

1. A recording calorimeter comprising, in combination with a heater for burning the combustible to be tested and having an inlet and an outlet for a liquid to be heated therein, of means for recording respectively the temperature of the liquid entering and the temperature of the liquid discharging from the heater.

2. A recording calorimeter comprising, in combination with a heater for burning the combustible to be tested and having an inlet and an outlet for a liquid to be heated therein, of means for recording individually upon the same graduated sheet the temperatures of the liquid entering and discharging from the heater respectively.

3. A recording calorimeter comprising, in combination with a heater for burning the combustible to be tested and having an inlet and an outlet for a liquid to be heated therein, of a pair of recording thermometers connected respectively to the inlet and the outlet of the heater, and means coöperative with each thermometer for producing upon the same graduated sheet individual records of the temperature of the liquid entering and of the liquid discharging from the heater respectively.

4. A recorder for calorimeters having a heater for burning the combustible to be tested and having an inlet and an outlet for a liquid to be heated therein comprising means for recording, individually, the temperature of the liquid entering the heater and the temperature of the liquid discharging from the heater, and means for checking the accuracy of the records so made.

5. A recorder for calorimeters having a heater for burning the combustible to be tested and having an inlet and an outlet for the liquid to be heated comprising a pair of recording thermometers connected, respectively, to the inlet and outlet of the heater, a graduated record sheet, means operative by the thermometer connected to the inlet of the heater for recording on the record sheet the temperature of the liquid entering the heater, means operative by the thermometer connected to the outlet of the heater for recording on the same record sheet the temperature of the liquid discharging from the heater, and indicators on the respective thermometers for checking the accuracy of the temperatures recorded by the respective thermometers.

6. A recorder for calorimeters of the type having a heater for burning the combustible to be tested, and an inlet and an outlet for liquid to be heated by the burning of the combustible to be tested, comprising a pair of recording thermometers subject individually to the temperature influences of the liquid entering and discharging from the heater, a graduated record sheet, means operative by the thermometer at the inlet of the heater for recording on the record sheet the temperature of the liquid entering the heater, and means operative independently of the means first mentioned for recording on the record sheet the temperature of the liquid discharging from the heater.

In testimony whereof I have hereunto set my hand in presence of two subscribing witnesses.

WALTER KENDRICK HARRINGTON.

Witnesses:
E. R. ABELL,
CHRIS. H. DICKEY.

Copies of this patent may be obtained for five cents each, by addressing the "Commissioner of Patents, Washington, D. C."